United States Patent
Guillaud et al.

(10) Patent No.: US 11,164,060 B2
(45) Date of Patent: Nov. 2, 2021

(54) METHOD IMPLEMENTED IN AN ELECTRONIC ENTITY AND ASSOCIATED ELECTRONIC ENTITY

(71) Applicant: IDEMIA FRANCE, Colombes (FR)

(72) Inventors: Philippe Guillaud, Colombes (FR); Bastien Duong, Colombes (FR)

(73) Assignee: IDEMIA FRANCE, Courbevoie (FR)

( * ) Notice: Subject to any disclaimer, the term of this patent is extended or adjusted under 35 U.S.C. 154(b) by 8 days.

(21) Appl. No.: 16/312,154

(22) PCT Filed: Jun. 21, 2017

(86) PCT No.: PCT/FR2017/051653
§ 371 (c)(1),
(2) Date: Dec. 20, 2018

(87) PCT Pub. No.: WO2017/220933
PCT Pub. Date: Dec. 28, 2017

(65) Prior Publication Data
US 2019/0236422 A1    Aug. 1, 2019

(30) Foreign Application Priority Data

Jun. 21, 2016 (FR) .................................... 1655789

(51) Int. Cl.
*G06K 19/067* (2006.01)
*G06K 19/077* (2006.01)
(Continued)

(52) U.S. Cl.
CPC ... *G06K 19/0677* (2013.01); *G06K 19/06196* (2013.01); *G06K 19/0719* (2013.01);
(Continued)

(58) Field of Classification Search
CPC ......... G06K 19/0677; G06K 19/06196; G06K 19/0719; G06K 19/07703;
(Continued)

(56) References Cited

U.S. PATENT DOCUMENTS

| | | | | |
|---|---|---|---|---|
| 5,365,047 A | * | 11/1994 | Yamaguchi | G06K 19/07 235/380 |
| 5,969,329 A | * | 10/1999 | Vallat | G06K 7/0013 235/475 |

(Continued)

FOREIGN PATENT DOCUMENTS

| | | |
|---|---|---|
| EP | 2 395 460 A1 | 12/2011 |
| EP | 2 746 993 A1 | 6/2014 |

(Continued)

OTHER PUBLICATIONS

International Search Report, dated Sep. 21, 2017, from corresponding PCT application No. PCT/FR2017/051653.

*Primary Examiner* — Nay Tun
(74) *Attorney, Agent, or Firm* — Nixon & Vanderhye

(57) ABSTRACT

A method implemented in an electronic entity capable of implementing a plurality of applications includes the following steps: detecting an electrical signal (D; D'); reading, in a memory of the electronic entity, information relating, among the plurality of applications, to a previously selected application; and transmitting a command (CMD) to deliver an indication associated with the application to which the read information relates. An associated electronic entity is also described.

18 Claims, 2 Drawing Sheets

(51) Int. Cl.
*G06K 19/07* (2006.01)
*G06K 19/06* (2006.01)
*G07F 7/08* (2006.01)

(52) U.S. Cl.
CPC . *G06K 19/07703* (2013.01); *G06K 19/07705* (2013.01); *G06K 19/07707* (2013.01); *G07F 7/0873* (2013.01); *G06K 19/0702* (2013.01); *G06K 19/0723* (2013.01)

(58) Field of Classification Search
CPC ....... G06K 19/07705; G06K 19/07707; G06K 19/0702; G06K 19/0723; G07F 7/0873
See application file for complete search history.

(56) References Cited

U.S. PATENT DOCUMENTS

| | | | | |
|---|---|---|---|---|
| 6,166,172 | A * | 12/2000 | McCullough | C08G 61/126 528/380 |
| 6,564,995 | B1 * | 5/2003 | Montgomery | G06K 19/0719 235/375 |
| 6,631,849 | B2 * | 10/2003 | Blossom | G06K 19/06187 235/380 |
| 7,044,368 | B1 * | 5/2006 | Barron | G06K 19/07 235/380 |
| 7,163,153 | B2 | 1/2007 | Blossom | |
| 7,191,952 | B2 | 3/2007 | Blossom | |
| 7,357,331 | B2 | 4/2008 | Blossom | |
| 7,591,416 | B2 | 9/2009 | Blossom | |
| 7,735,733 | B2 * | 6/2010 | Kranzley | G07F 7/08 235/439 |
| 7,766,244 | B1 * | 8/2010 | Field | G06Q 20/357 235/487 |
| 7,815,125 | B2 * | 10/2010 | Stranges | G06K 19/07 235/492 |
| 7,899,753 | B1 * | 3/2011 | Everhart | G06Q 20/0855 705/67 |
| 7,954,708 | B2 | 6/2011 | Blossom | |
| 8,226,001 | B1 * | 7/2012 | Foo | G06K 19/06206 235/449 |
| 8,308,059 | B2 * | 11/2012 | Granucci | G06K 19/07 235/379 |
| 8,528,813 | B1 | 9/2013 | Blossom | |
| 8,590,796 | B1 * | 11/2013 | Cloutier | G06K 19/07707 235/488 |
| 8,602,301 | B1 | 12/2013 | Blossom | |
| 8,602,327 | B2 | 12/2013 | Meslin | |
| 8,684,261 | B2 * | 4/2014 | Burdett | G06Q 20/26 235/379 |
| 9,021,504 | B2 * | 4/2015 | Diallo | G06Q 20/341 719/318 |
| 9,064,195 | B2 * | 6/2015 | Hartwick | G06K 19/06206 |
| 9,940,567 | B2 | 4/2018 | Barbe et al. | |
| 10,022,884 | B1 * | 7/2018 | Cloutier | B26D 7/27 |
| 10,026,078 | B1 * | 7/2018 | Nolan | G06Q 20/3572 |
| 10,504,105 | B2 * | 12/2019 | Mullen | G06F 3/044 |
| 2002/0023032 | A1 * | 2/2002 | Pearson | G06Q 20/20 705/35 |
| 2002/0046116 | A1 * | 4/2002 | Hohle | G06Q 20/10 705/14.27 |
| 2003/0111527 | A1 * | 6/2003 | Blossom | G06K 19/06187 235/380 |
| 2003/0212895 | A1 * | 11/2003 | Kisliakov | G06K 19/07 713/185 |
| 2004/0238625 | A1 * | 12/2004 | Walker | G06K 19/0716 235/380 |
| 2005/0211784 | A1 * | 9/2005 | Justin | G06Q 20/341 235/492 |
| 2006/0249504 | A1 * | 11/2006 | Kaney | A47J 27/004 219/435 |
| 2007/0034700 | A1 * | 2/2007 | Poidomani | G06K 19/0702 235/492 |
| 2009/0298543 | A1 * | 12/2009 | Willemin | G06K 19/0723 455/558 |
| 2011/0303743 | A1 * | 12/2011 | Meslin | G06K 19/07703 235/375 |
| 2012/0187199 | A1 * | 7/2012 | Poidomani | G06K 19/06206 235/492 |
| 2012/0191612 | A1 * | 7/2012 | Spodak | G06K 19/07707 705/65 |
| 2012/0248200 | A1 | 10/2012 | Cho | |
| 2012/0254037 | A1 * | 10/2012 | Mullen | G06Q 30/0238 705/44 |
| 2012/0293524 | A1 * | 11/2012 | Tada | G06K 19/07703 345/530 |
| 2014/0050903 | A1 * | 2/2014 | Lettow | H01B 1/24 428/201 |
| 2014/0084059 | A1 * | 3/2014 | Sierchio | G07F 7/0846 235/380 |
| 2015/0324682 | A1 * | 11/2015 | Barbe | G06K 19/0719 235/492 |
| 2015/0324683 | A1 * | 11/2015 | Linfield | G06K 19/07769 235/492 |
| 2017/0286726 | A1 * | 10/2017 | Cohen | G06Q 30/0207 |

FOREIGN PATENT DOCUMENTS

WO 99/16030 A1 4/1999
WO 02/47022 A1 6/2002

* cited by examiner

METHOD IMPLEMENTED IN AN ELECTRONIC ENTITY AND ASSOCIATED ELECTRONIC ENTITY

BACKGROUND OF THE INVENTION

Field of the Invention

The present invention relates to the electronic entities (such as microcircuit cards) designed to implement a plurality of applications.

It relates more specifically to a method implemented in an electronic entity and an associated electronic entity.

The invention is particularly advantageously applied in the case where the electronic entity makes it possible for the user to select, by interaction with the single electronic entity, the application to use.

Description of the Related Art

In the electronic entities designed to implement a plurality of applications, it has already been proposed as described for example in document EP 2 395 460, to control an indicator of the electronic entity in a configuration representative of the application selected at a reader communicating with the electronic entity.

This solution makes it possible to simply inform the user regarding the application actually selected by the reader. It is not however applicable when the electronic entity makes it possible for a previous selection of the application to use, without intervention of the reader.

SUMMARY OF THE INVENTION

In this context, the present invention proposes a method implemented in an electronic entity capable of implementing a plurality of applications, comprising the following steps:

upon detecting an electrical signal, reading, in a memory of the electronic entity, of information pointing, among said plurality of applications, to a previously selected application;

transmitting of a command to deliver an indication associated with the application pointed to by the read information.

Later on after selecting an application, an indication is thus presented (for example by displaying on a screen or by activating a given light-emitting diode) which reminds the user which application is currently selected.

According to the characteristics which can be optionally considered (and are therefore not limiting):

the electrical signal is generated by application of a voltage on an external contact of the electronic entity;

this external contact is flush with an external surface of the electronic entity;

this external contact is a contact of a contact interface which conforms with the standard ISO/IEC 7816, for example a supply contact;

the electrical signal is generated by an antenna subjected to a magnetic field, for example a magnetic field which conforms with the standard ISO/IEC 14443 or with the standard ISO/IEC 15693;

the method comprises a step of previously selecting the application by (direct) interaction of a user with the electronic entity;

the prior selection step is carried out by pressing a button of the electronic entity;

the electronic entity comprises a microcontroller comprising said memory;

the reading and transmitting steps are implemented by said microcontroller;

the electronic entity comprises a processor designed to selectively implement an application among the plurality of applications;

the processor is separate from the microcontroller;

the electronic entity is a microcircuit card;

the electronic entity comprises an indicator circuit;

the command to deliver an indication is transmitted to the indicator circuit;

the indicator circuit comprises at least one light-emitting diode (in practice, the indicator circuit can comprise a plurality of light-emitting diodes respectively associated with the applications of said plurality of applications);

the indicator circuit is a display unit (such as a screen);

the command to deliver an indication is transmitted (by means of a communication circuit, capable of implementing, for example, a Bluetooth type connection) to an external electronic device comprising a display unit (for example, a screen) such that the display unit can deliver (i.e. present to the user, or also here display) said indication.

The invention also proposes an electronic entity designed to implement a plurality of applications and comprising:

a module for reading, in a memory of the electronic entity and upon detecting an electrical signal, information pointing, among said plurality of applications, to a previously selected application;

a module for transmitting a command to deliver an indication associated with the application pointed to by the read information.

The optional characteristics mentioned above in terms of method can possibly be applied to such an electronic entity.

BRIEF DESCRIPTION OF THE DRAWINGS

The description which will follow regarding the appended drawings, given as non-limiting examples, will enable what the invention consists of to be well understood, and how the invention can be implemented.

In the appended drawings.

DESCRIPTION OF THE PREFERRED EMBODIMENTS

Figure 1:
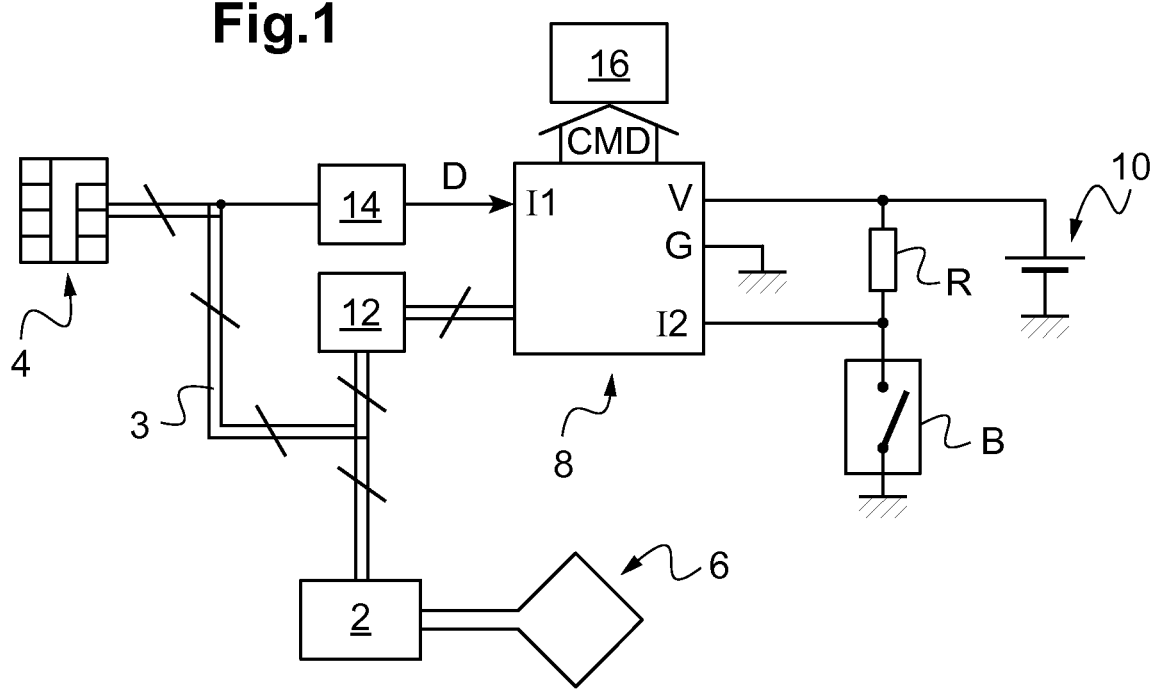
FIG. 1 schematically represents the main elements of a first example of an electronic entity which conforms with the invention.

FIG. 1 schematically represents the main elements of a first example of an electronic entity, here a microcircuit card, which conforms with the invention.

The microcircuit card of FIG. 1 comprises a processor 2 connected to a contact interface 4 by means of a bus 3, here a bus which conforms with the standard ISO/IEC 7816.

The processor 2 is, for example, a secure element, such as an integrated circuit making it possible to execute (here in the scope of the EMV standard) an application selected among several applications (or applets) stored within the processor 2.

The contact interface 4 here comprises (in conformity with the abovementioned standard ISO/IEC 7816) eight contacts referenced C1 to C8, with a supply contact C1, a reinitialization contact C2, a clock contact C3, a ground contact C5, a programming contact C6, an input/output contact C7 and two unused contacts C4, C8.

These contacts are flush with the upper surface of the microcircuit card. When the microcircuit card is inserted in a card reader, the processor 2 can thus exchange data with the card reader via the contact interface 4.

The processor 2 is further here (directly) connected to an antenna 6 such that the processor 2 can exchange data with an external electronic device by means of a wireless connection, for example according to the NFC protocol, in conformity with the standard ISO/IEC 14443 or ISO/IEC 15693.

The microcircuit card of FIG. 1 also comprises a microcontroller 8. The microcontroller 8 is here supplied by a battery 10 of which the positive terminal is connected to a supply terminal V of the microcontroller 10 (the negative terminal of the battery 10 forming a ground). A ground terminal G of the microcontroller is itself connected to the ground, as indicated in FIG. 1.

The microcontroller 8 is moreover connected to the bus 3 by means of an adapter 12. The microcontroller 8 can thus exchange data with the processor 2 via the bus 3, in conformity with the standard ISO/IEC 7816. The adapter 12 makes it possible for an adaptation of electrical level for the electrical signals coming from the contact interface 4 (for example, an adaptation to a predetermined level, here 3V, used by the microcontroller 8).

A detection circuit 14 moreover receives, at the inlet, an electrical signal present on the bus 3 (for example, the signal present on the abovementioned supply contact C1). The detection circuit 14 is designed to transmit a detection signal D to a first interruption terminal 11 of the microcontroller 8 when it receives, at the inlet, an active logic signal, i.e. here when a (non-zero) supply voltage is applied (for example, by a card reader) on the contact C1.

A second interruption terminal 12 of the microcontroller 8 is further connected to the positive terminal of the battery 10 with a resistance R.

The microcircuit card of FIG. 1 moreover comprises a button B (situated for example on the surface of the microcircuit card) of which the actuation by the user closes an electric path between the second interruption terminal 12 and the ground, as represented in FIG. 1.

Thus, in the absence of pressure on the button B, the voltage on the second interruption terminal 12 is around the voltage supplied by the battery 10, while the voltage on the second interruption terminal 12 is zero (by connecting this second interruption terminal 12 to the ground) when a user actuates (i.e. presses) the button B.

The microcontroller 8 comprises a microprocessor and a memory which in particular stores computer program instructions designed such that the microcontroller 8 implements in particular the steps described below when these instructions are executed by the microprocessor.

As explained below, the memory of the microcontroller 8 furthermore stores information pointing to the application currently selected among the plurality of applications which can be executed by the processor 2.

Finally, the microcontroller 8 is designed to transmit commands CMD to an indicator circuit 16, for example in accordance with the method described below in reference to FIG. 2.

The indicator circuit 16 comprises here a plurality of light-emitting diodes which can each be selectively active or inactive according to the commands CMD received from the microcontroller 8.

The indicator circuit 16 is arranged on the microcircuit card (here on the upper face of the microcircuit card) so as to be visible for the user even when the microcircuit card is inserted in a reader. To do this, the indicator circuit 16 is, for example, arranged on the upper face of the microcircuit card in a region situated opposite another region supporting the contact interface 4.

In the example described here, the processor 2 can implement a plurality of applications respectively associated with a plurality of currencies (the microcircuit card being configured to make it possible for the payment in each of these currencies) and each light-emitting diode is associated with one of these currencies (a symbol representing the currency being, for example printed on the upper face of the microcircuit card in the proximity of the light-emitting diode associated with this currency).

In a variant, the indicator circuit 16 could be a display unit, for example an e-ink, matrix or segment display screen, or an LCD (liquid crystal display) type or OLED (organic light-emitting diode), matrix or segment type display screen, or also an e-paper type, by using for example a bi-stable screen.

Also, according to another variant, the indicator circuit 16 could be replaced by a communication circuit making it possible to establish a connection (for example, a wireless connection, such as a Bluetooth connection or, in a variant, a connection via a local wireless network, or a GSM or UMTS or LTE type network, or also a LoRaWAN type network, or a SIGFOX type network) with an external electronic device comprising a display unit; the commands CMD transmitted by the microcontroller CMD are, in this case, commands for transmitting to the external electronic device, via the established connection, of instructions for display of an indication on the display unit of the external device.

Such an external electronic device is, for example, a mobile terminal, a telephone, a smartphone, a digital tablet or a wearable electronic device (such as a connected watch or connected glasses).

Figure 2:
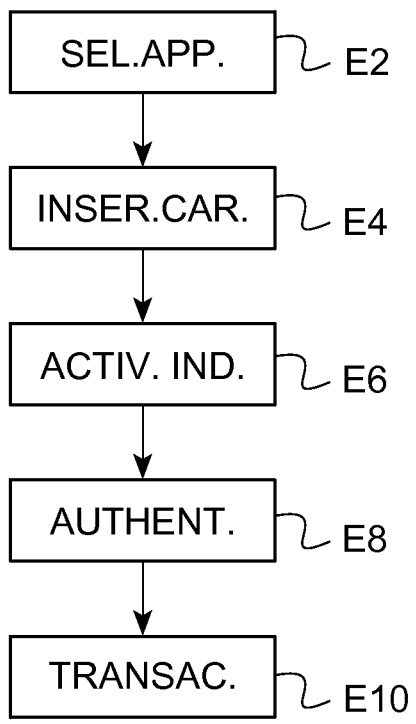
FIG. 2 presents an example of a method which conforms with the invention.

FIG. 2 describes an example of a method which conforms with the invention, implemented by using the microcircuit card of FIG. 1.

This method starts with a step E2 during which the user selects an application among the plurality of applications stored in the processor 2 and which can be executed by it.

In the example described here, where the microcircuit card of FIG. 1 is used, the user presses the button B to do this.

An interruption is generated within the microcontroller 8 each time the voltage on the second interruption terminal 12 reaches a low level (i.e. each time the user presses the button B).

It is provided here for example, that when the microcontroller is in a standby mode in order to limit the consumption thereof, the first interruption leads to the microcontroller 8 awakening, and that the following interruptions successively lead to the selection of each of the other applications.

Moreover, it can be provided, that immediately after the microcontroller 8 is awakened, it obtains (or verifies) the value of the application currently selected by contacting the processor 2 (via the adapter 12 and the bus ISO/EIC 7816).

At each new selection of an application by pressing the button B, the microcontroller 8 transmits an instruction for selecting the application in question, sent to the processor 2 (via the adapter 12 and the bus ISO/EIC 7816) and moreover modifies the data indicative of the application currently selected (data stored, as already indicated above, in the memory of the microcontroller 8). The instruction for selecting the application in question is, for example, an APDU command transmitted from the microcontroller 8 to the processor 2.

It is further provided that at each new selection of an application, the microcontroller 8 transmits a command CMD for activating the light-emitting diode associated with the application in question (corresponding here to the currency wherein the newly selected application makes it possible to pay).

In order to end the process for selecting the application (step E2), the microcontroller 8 counts, for example, the time elapsed without actuating the button B: the application ultimately selected is the last application selected when the time elapsed reaches a predetermined duration (for example, of between 2 s and 10 s, here 5 s).

Moreover, when the time elapsed reaches the predetermined duration, the microcontroller 8 for example transmits a command CMD for flashing the light-emitting diode associated with the last application selected, then a command for shutting down the indicator circuit 16 (no light-emitting diode thus being activated); the microcontroller 8 can then toggle into standby mode.

The method of FIG. 2 continues in step E4 at which the microcircuit card of FIG. 1 is inserted in a card reader.

When the microcircuit card is correctly positioned in the card reader, the card reader in particular applies a supply voltage on the contact C1 of the contact interface 4.

The detection circuit 14 detects this supply voltage on the contact C1 and thus generates the detection signal D on the first interruption terminal 11 of the microcontroller 8, which triggers an interruption within the microcontroller 8.

This interruption leads to the microcontroller 8 awakening; the microcontroller 8 thus reads, in the memory thereof, the data indicative of the application currently selected and transmits a command CMD sent to the indicator circuit 16 so as to activate the light-emitting diode associated with the application pointed to by the read indicative data (step E6).

The user can thus verify which is the application currently selected, and which will therefore be executed by the processor 2 (as explained below).

Indeed, in parallel to step E6, the card reader exchanges data with the processor 2 via the contact interface 4 and the bus 3.

After a process for initializing the communication between the card reader and the processor 2, the processor 2 executes the application last selected (the processor 2 having previously received a command for selecting this application coming from the microcontroller 8 as explained above).

The execution of the application by the processor 2 involves, for example, a process for authenticating the microcircuit card by the card reader and/or a process for authenticating the user (step E8).

The process for authenticating the microcircuit card by the card reader uses, for example, an item of secret data (such as a cryptographic key) stored within the processor 2.

In the example described here, where the microcircuit card is a payment card, the process for authenticating the user comprises a step of entering a personal code (generally called "PIN code") on a keypad of the card reader and the communication of the code entered to the processor 2 via the contact interface 4 and the bus 3. The authentication process could comprise, in a variant or in combination, a step of biometric identification (using for example, a fingerprint or retinal scan).

The indication of the application currently selected in step E6 makes it possible as already indicated to the user to verify that this application corresponds to the choice thereof and to only enter the personal code thereof after having made this verification.

The processor 2 receives the personal code entered and compares this personal code to that stored within the processor 2.

In case of a positive result to this comparison (i.e. generally if the authentication of step E8 is achieved), the transaction is authorized (step E10).

Figure 3:
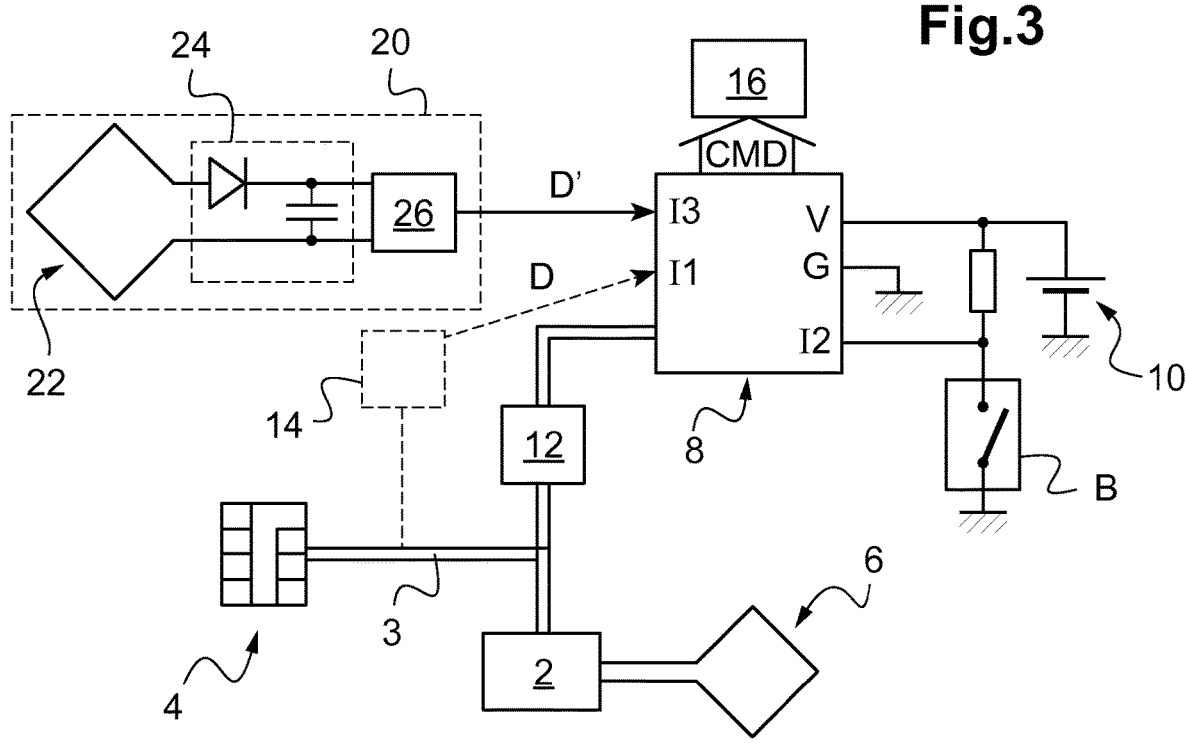
FIG. 3 schematically represents the main elements of a second example of an electronic entity which conforms with the invention.

FIG. 3 schematically represents the main elements of a second example of an electronic entity which conforms with the invention.

The electronic entity of FIG. 3 is a microcircuit card of which most of the elements are identical to those of the microcircuit card of FIG. 1 and will not therefore be described again.

In certain embodiments, the microcircuit card of FIG. 3 could not comprise the detection circuit 14 (consequently represented as a dotted line in FIG. 3).

The microcircuit card of FIG. 3 however comprises a magnetic field sensor 20 designed to detect a magnetic field such as used in the scope of the wireless connection mentioned above (by means of which the processor 2 can interact with a reader via the antenna 6), and to generate a second detection signal D' upon detecting such a magnetic field.

In the example described here, the magnetic field sensor 20 is designed to detect a magnetic field which conforms with the standard ISO/IEC 14443 or ISO/IEC 15693.

The magnetic field sensor 20 comprises, for example, an antenna 22, a envelope detector 24 connected to the antenna and a voltage adapter 26 which receives a voltage generated by the envelope detector 24 and generates the second detection signal D' (with a voltage adapted to the voltages used by the microcontroller 8) when the voltage received from the envelope detector 24 is greater than a predetermined threshold.

The second detection signal D' is applied to a third interruption terminal 13 of the microcontroller 8.

The antenna 22 is positioned similarly to the antenna 6. Thus, when the user moves the microcircuit card of FIG. 3 closer to a contactless reader, the magnetic field sensor 20 generates the second detection signal D' on the third interruption terminal 13. The microcontroller 8 can thus command the activation of a light-emitting diode of the indicator circuit 16 corresponding to the application currently selected (as stored in the memory of the microcontroller), as explained below in reference to FIG. 4.

In a variant, it could be provided to replace the magnetic field sensor 20 by a light sensor. In this case, it is not the proximity of a contactless reader which would trigger the activation of the light-emitting diode associated with the application currently selected, but the presence of a certain ambient luminosity. The light-emitting diode associated with the application currently selected would thus be, for example activated when the user removes the microcircuit card from their wallet with a view to pay.

Figure 4:
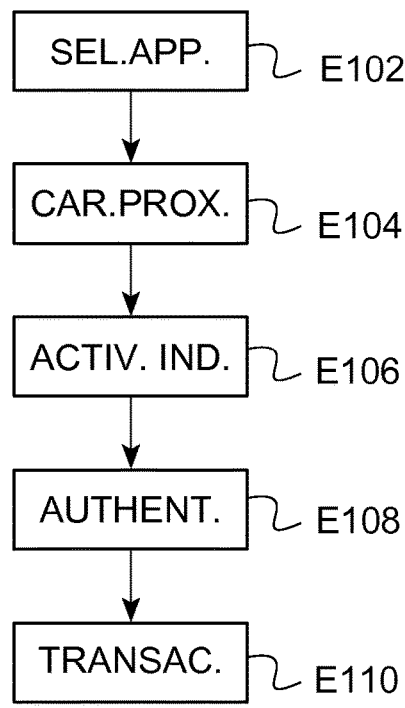
FIG. 4 presents another example of a method which conforms with the invention.

FIG. 4 describes another example of a method which conforms with the invention, implemented by using the microcircuit card of FIG. 3.

This method starts with a step E102 during which the user selects (by actuating the button B) an application among a plurality of applications stored in the processor 2 and which can be executed by it.

This step is identical to step E2 of FIG. 2 described above and therefore will not be described again.

At a later time of using the microcircuit card of FIG. 3, the user approaches this microcircuit card from a contactless reader in order to make a payment (or generally a transaction).

When the microcircuit card is sufficiently close to the contactless reader, the magnetic field generated by the contactless reader is detected by the magnetic field sensor 20 (step E104).

The magnetic field sensor 20 therefore generates the second detection signal D', which leads to an interruption (via the third interruption terminal 13) within the microcontroller 8.

This interruption leads to the microcontroller 8 awakening; the microcontroller 8 thus reads, in the memory thereof, the data indicative of the application currently selected and transmits a command CMD sent to the indicator circuit 16 so as to activate the light-emitting diode associated with the application pointed to by the read indicative data (step E106).

The user thus views the application currently selected and which will thus be executed by the processor 2 (as explained below).

Indeed, alongside step E106, the contactless reader exchanges data with the processor 2 via the antenna 6.

After a process for initializing the communication between the contactless reader and the processor 2, the processor 2 executes the application last selected (the processor 2 having previously received a command for selecting this application coming from the microcontroller 8 during step E102, as explained above in the scope of the description of step E2).

The execution of the application by the processor 2 involves, for example, a process for authenticating the microcircuit card by the card reader (step E108). This process for authenticating the microcircuit card by the contactless reader uses, for example, an item of secret data (such as a cryptographic key) stored within the processor 2.

In case of a positive result to the authentication step E108, the transaction is authorized (step E110), which ends the method of FIG. 4.

Moreover, it is noted, that when it comprises a detection circuit 14, the microcircuit card of FIG. 3 can also implement the method described above in reference to FIG. 2.

The invention claimed is:

1. A method implemented in an electronic entity comprising a button and a processor and configured to implement a plurality of applications executable by said processor, said electronic entity comprising a memory storing information pointing, among said plurality of applications, to an application currently selected, the method comprising the following steps:
   performing a selection process whereby several applications are successively selected by pressing the button;
   ending the selection process when the time elapsed without actuating the button reaches a predetermined duration;
   upon detecting an electrical signal, reading, in said memory, said information pointing, among said plurality of applications, to the application currently selected; and
   transmitting a command to deliver an indication associated with the application pointed to by the read information.

2. The method according to claim 1, wherein the electrical signal is generated by applying a voltage on an external contact of the electronic entity.

3. The method according to claim 2, wherein the external contact is flush with an external surface of the electronic entity.

4. The method according to claim 3, wherein the external contact is a contact of a contact interface which conforms with the standard ISO/IEC 7816.

5. The method according to claim 2, wherein the external contact is a contact of a contact interface which conforms with the standard ISO/IEC 7816.

6. The method according to claim 1, wherein the electrical signal is generated by an antenna subjected to a magnetic field.

7. The method according to claim 1, wherein the electronic entity comprises a microcontroller comprising said memory and wherein the reading and transmitting steps are implemented by said microcontroller.

8. The method according to claim 1, further comprising a step of execution, by said processor, of the application currently selected.

9. The method according to claim 8, wherein the electronic entity comprises a microcontroller comprising said memory, wherein the reading and transmitting steps are implemented by said microcontroller, and wherein the processor is separate from the microcontroller.

10. The method according to claim 1, wherein the electronic entity is a microcircuit card.

11. The method according to claim 1, wherein the electronic entity comprises an indicator circuit and wherein the command to deliver an indication is transmitted to the indicator circuit.

12. The method according to claim 11, wherein the indicator circuit comprises at least one light-emitting diode.

13. The method according to claim 11, wherein the indicator circuit is a display unit.

14. The method according to claim 1, wherein the command to deliver an indication is transmitted to an external electronic device comprising a display unit.

15. The method according to claim 1, wherein, at each selection of an application by pressing the button during the selection process, said information is modified.

16. An electronic entity configured to implement a plurality of applications and comprising:
   a button;
   a memory storing information pointing, among said plurality of applications, to an application currently selected;
   a processor configured to execute the application currently selected; and
   a microcontroller programmed to execute the following steps:
   performing a selection process whereby several applications are successively selected by pressing the button;
   ending the selection process when the time elapsed without actuating the button reaches a predetermined duration;
   reading, in said memory and upon detecting an electrical signal, said information pointing, among said plurality of applications, to the application currently selected; and transmitting a command to deliver an indication associated with the application pointed to by the read information.

17. A method implemented in an electronic entity comprising a button, a processor and a memory and configured to implement a plurality of applications executable by the processor, the method comprising the following steps:
- performing a selection process whereby several applications are successively selected by pressing the button;
- ending the selection process when the time elapsed without actuating the button reaches a predetermined duration;
- storing information pointing to the application ultimately selected in said memory;
- toggling into standby mode;
- upon detecting an electrical signal, reading in said memory the stored information pointing to the selected application;
- transmitting a command to deliver an indication associated with the application pointed to by the read information; and
- executing, by the processor, the application pointed to by the read information.

18. The method according to claim 17, wherein, at each selection of an application by pressing the button during the selection process, said information is modified.

\* \* \* \* \*